United States Patent [19]

Fujita

[11] 4,179,775

[45] Dec. 25, 1979

[54] ADJUSTABLE CLAMPING DEVICE

[75] Inventor: Susumu Fujita, Kobe, Japan

[73] Assignee: Nittan Kohki Co., Ltd., Sakai, Japan

[21] Appl. No.: 922,424

[22] Filed: Jul. 6, 1978

[30] Foreign Application Priority Data

Jul. 11, 1977 [JP] Japan ................................. 52-83232
Oct. 7, 1977 [JP] Japan ................................. 52-121292

[51] Int. Cl.² ............................................ A44B 21/00
[52] U.S. Cl. ................................ 24/249 R; 24/211 M; 24/251; 269/250; 279/33
[58] Field of Search ........ 24/249 R, 249 LS, 263 DB, 24/211 M; 269/250; 279/33, 35

[56] References Cited

U.S. PATENT DOCUMENTS

| | | | |
|---|---|---|---|
| 94,185 | 8/1876 | Strybel | 24/263 A |
| 1,692,398 | 11/1928 | Weaver | 24/249 R |

*Primary Examiner*—Bernard A. Gelak
*Attorney, Agent, or Firm*—Wenderoth, Lind & Ponack

[57] ABSTRACT

An adjustable clamping device for clamping a pipe or the like of round peripheral shape through peripheral clamping engagement, comprising a driving unit, and only two pairs of members including a movable clamping member to be driven by the driving unit, and yet being provided with the internal self-oscillating arrangement to cause the members to be smoothly interslid and interleaved with each other when the forcibly effecting relative movement of the movable clamping member is effected along a preselected longitudinal line of movement, which can define a clamping array with the adjustment of the clamping members in spaced relationship to the center axis of an object to be clamped, being effected automatically by the adjustment of the movable clamping member with the other clamping members being automatically, relatively guided by the movable clamping member mentioned above into variably spaced relationship to the axis of the object to be clamped.

8 Claims, 10 Drawing Figures

ADJUSTABLE CLAMPING DEVICE

BACKGROUND OF THE INVENTION

The present invention relates to clamping means for clamping a pipe or the like through peripheral clamping engagement and more particularly, to an adjustable clamping assembly of the above described type.

Up to the present, many types of clamping devices including the device for slidably clamping the pipe or the like through peripheral clamping engagement have been proposed.

The clamping device through peripheral clamping engagement mentioned above is known to be quite handy and convenient, especially for fixedly clamping the pipes or the like of the round peripheral shape, due to the fact that the clamping device of the above described type can define a plurality of clamping arrays with the adjustment of the clamping members in spaced relationship to the center axis of the object to be clamped, which may not be otherwise attained by any other types of the clamping devices.

Usually, since the device of the above described type comprises a plurality of sets or units of clamping surface members, and each set further includes a plurality of members coplanar with each other and yet, being expected to be slidable for effectively accomplishing the relative, intersliding and interleaving movement therebetween, the respective members mentioned above not only have to be provided with precise dimensions, especially precise width thereof, but also should be surface-treated to a high degree of precision.

Adjustable clamping means disclosed, for example, in Japanese Laid-Open Patent Publication No. 51-94185, Aug. 18, 1976, for clamping any one of a plurality of objects having different cross-sections includes a first sliding member having a first, substantially rectilinear slot, a second slide member having a second, substantially rectilinear slot substantially coplanar with the first slot, a third slide member having a first slide portion slidably received in the first slot, a second slide portion slidably received in the second slot, and a clamping portion between the slide portions, means for mounting the first and second members for variable spacing therebetween along a preselected line of movement with the slots extending toward each other at equal and opposite acute angles to the line of movement, the clamping portion of the third slide member being variably positioned in a direction perpendicular to the line of movement as a result of the variable spacing of the first and second slide members, the first and second slide members further defining clamping surfaces adjacent the third slide member clamping portion and defining therewith an adjustable size polygonal array of clamping surfaces facing inwardly toward a clamping space in which the object to be clamped is received for peripheral clamping engagement by the clamping surfaces, and means for forcibly effecting relative movement of the first and second slide members toward each other along the line of movement.

The prior art described above has well defined characteristics for clamping the pipes or the like through peripheral clamping engagement.

However, since the movable stack, as a whole, is clamped in order to be rigidly guided toward the longitudinal line of movement relative to the other stacks, every corresponding member to be interslid and interleaved in the other stacks should be layered, in succession, to be precisely coplanar with the corresponding member comprising the movable stack mentioned above for simultaneously accomplishing respective good peripheral engagements therebetween. Thus, as is clear from the situation mentioned above, if the effective automatically intersliding and interleaving clamping process by the arrangement described in the prior art is expected, the respective member comprising the respective clamping unit must be accordingly not only defined in quite precise dimensions, especially in respective width, but also surface-treated to a high degree of precision, to prevent the mutual interference actuation concerning the relative sliding motion therebetween.

Furthermoe, even if the conditions concerning the respective members comprising a clamping unit, which should be coplanar with each other, are satisfied, the members to be relatively interslid must be restricted in their relative movement due to the surface friction caused by the inevitable, close contact between the adjacent layers due to the reason mentioned above. Therefore, the resultant peripheral clamping must result only local and thereby, the only partial clamping units comprising the stacks are functional.

Although the undesirable situation concerning the adjustable sliding means is not specific only for the prior art indicated above, the adjustable clamping means including the intersliding and interleaving members whose relative motion is perpendicular to the line of movement of the movable stack as well as whose legportions to be interleaved with the slots extending toward each other at equal and opposite acute angles to the line of movement is most specifically corresponding to the situation described in the foregoing, because of the difficulties of relative actuation of the intersliding movement when compared with the other arrangements of the members provided with the other characteristics concerning dimensions and predetermined intersliding movements.

SUMMARY OF THE INVENTION

Accordingly, an essential object of the present invention is to provide an adjustable clamping device, which can define a clamping array with the adjustment of the clamping members in spaced relationship to the center axis of the object to be clamped, being effected automatically by the adjustment of one clamping member with the other clamping member being automatically, relatively guided by said one clamping member into variably spaced relationship to the axis of the object to be clamped.

Another important object of the present invention is to provide an adjustable clamping device of the above described type, which can smoothly and effectively clamp an object with only two pairs of members through the self-pivotal and self-oscillating mechanical characteristics thereof, when the interslide and thereby, interleaving with each other.

A further object of the present invention is to provide an adjustable clamping device of the above described type, whose securing portions define therewith an adjustable size parallelogram as well as octangular array of clamping surfaces facing inwardly toward a clamping space.

A still further object of the present invention is to provide an adjustable clamping device of the above described type, which is simple in structure and highly efficient in use and can be manufactured at low cost.

In accomplishing these and other objects according to one preferred embodiment of the present invention, there is provided an adjustable clamping device, which comprises a pair of basic boards for retaining a plurality of the members of the present invention therebetween, both being formed in slender, rectangular shapes while each having a through bore therein for permitting a clamping object to be inserted therethrough, a clamping unit including a pair of longitudinally clamping members, and a pair of laterally clamping members to be interslid and interleaved between the pair of the longitudinally clamping members, said two pairs of the members being coplanar with each other, and five to ten of said clamping units being usually retained between the pair of basic boards for practically assembling the device of the present invention, and a driving unit for forcibly effecting relative movement of the longitudinally clamping members and the laterally clamping members toward each other along a preselected line of movement, wherein the clamping assembly is arranged to define a clamping array with the adjustment of the clamping members in spaced relationship to the center axis of the object to be clamped, being effected automatically by the adjustment of one longitudinally clamping member with the other clamping members being automatically, relatively guided by said longitudinally clamping member into variably spaced relationship to the axis of the object to be clamped.

Specifically, there is provided respective pair of the projected portion and recessed portion on both sides of the longitudinal centerline of the longitudinally clamping member, while the respective distances and their turns of the projected portion and the recessed portion on respective side with respect to the head edge of the member arranged to become different therebetween in a manner such that, when these longitudinally clamping members are stacked in succession in a symmetrical manner with each other to offset 180° about the centerline toward centerline on the basic board, copossessing the same center axis, the paired combinations of the upwardly projected portions and downwardly projected portions renders respective clearance between their respective interface, whereby even if variation in substantial width either in a plurality of the longitudinally clamping members as well as the laterally clamping members exists, the respective clearance described above permits the pair of the laterally clamping members to interslide and interleave nearly coplanarly with each other within the clearances described above or the height of the projected portion on the longitudinally clamping members.

Furthermore, due to the respective clearance between the adjacent layers by the arrangement described above, even if the external driving force is local for the movement of the movable stack of the longitudinally clamping members, the movable stack, as a whole, can be easily driven to slide toward the other stack of the longitudinally clamping members remaining stationary and thereby, completely effecting the intersliding relative motion among the members of the respective clamping unit due to the reduced contacting surface of the adjacent layers.

In connection with the stacking method of the longitudinally clamping members, the successive members to be stacked may be reversed in the positioning thereof with each other together with the laterally clamping members in pair and thereby, the resultant clamping array constituted by the two adjacent layers becomes octangular, whereby the resultant four pairs of the securing portions provided with the two layers define therewith an adjustable size octangular array of clamping surfaces facing inwardly toward a clamping space.

More specifically, the guiding groove or slot formed in the longitudinally clamping member has a guiding entrance for slidably accommodating the laterally clamping member. The forward end of the guiding groove is arranged to extend beyond the longitudinal centerline of the assembly itself so far as to the longitudinally rear part of the rounded portion formed in the longitudinally clamping member prepared for the purpose mentioned hereinbelow, with the plain width thereof gradually increasing, while the cornering edge portion is formed at the guiding entrance of the guiding groove successively for accomplishing to effect respective point of action concerning the successive, sliding motion of the laterally clamping member to be smoothly guided into the groove of the longitudinally clamping member whose other rounded end portion is, on the contrary, coupled with the other side member of the pair of the longitudinally clamping members and remains relatively stationary, when the relative movement of the pair of the longitudinally clamping members toward each other along the line of movement is forcibly effected. The portion interposed between the pair of grooves mentioned above in the longitudinally clamping member is arranged to protrude to some extent from the longitudinally clamping member, with the forward end thereof being arranged to define a slanted shape for constituting the securing portion of the longitudinally clamping member. Furthermore, the inner portion of the laterally clamping member is arranged to protrude from the other portion of the laterally clamping member, with the forward end thereof being arranged to define a slanted shape for constituting the securing portion of the laterally clamping member. Moreover, as for the engagement between the dovetail groove formed in the longitudinally clamping member layered and the dovetail provided at the forward end of the threaded rod, the dimensional characteristics of the dovetail groove mentioned above relative to the dimensions of the dovetail is arranged to provide respective longitudinal or radial clearances when engaged by the dovetail of the threaded rod, whereby the apparently continuous groove formed in the longitudinally clamping members piled or the stack of the longitudinally clamping memers and the dovetail are loosely engaged therebetween due to the clearances mentioned above, and thereby, the dovetal as well as the movable stack of the longitudinally clamping members, which are not guided or loosely guided by the guiding shaft and the groove connection, can relatively oscillate with respect to the preselected longitudinal line of movement of the movable stack, when the threaded rod is forwardly effected.

The permissive oscillating movement concerning the stack of the longitudinally clamping members themselves, as a whole, described above, accompanied by the effects caused not only by the loose engagement between the groove or the slot formed in the longitudinally clamping member and the inclined portion due to the substantial wide difference therebetween described in the foregoing, but also by the reduced contacting surface of adjacent layers as described in the foregoing, permits the respective securing portion thereof to gradually face the outer circumference of the pipe or the object to be secured therewith while the respective pair of both pairs being spaced in parallel relation with each other, when the laterally clamping member is further, gradually guided into the groove and forced to adapt to face the outer circumference of the pipe or the object for accomplishing peripheral clamping engagement.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
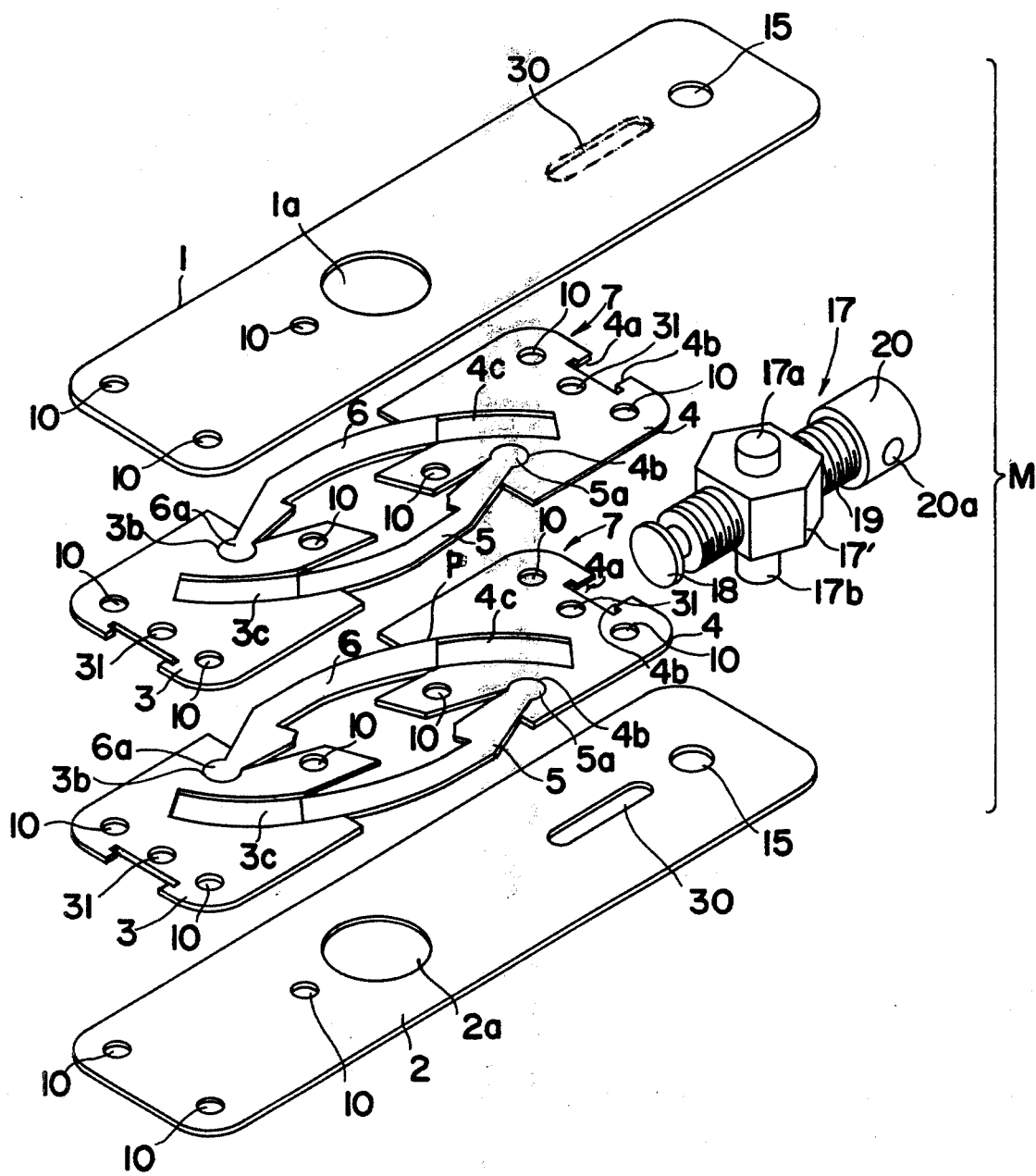
FIG. 1 is an exploded view of an adjustable clamping device of the present invention, with the comprising members being disassembled.
Figure 2:
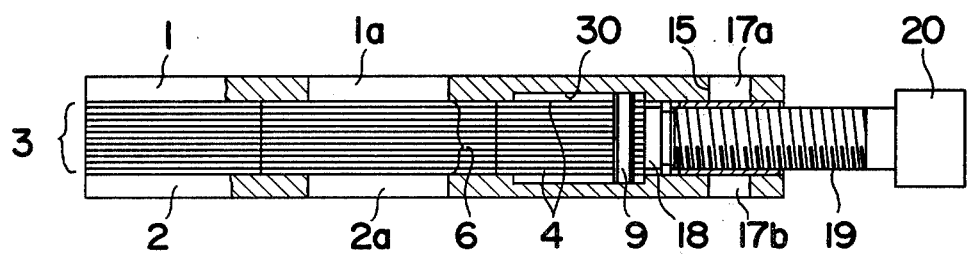
FIG. 2 is a side view in section taken along the longitudinal centerline of the embodiment shown in FIG. 1, after the comprising members having been assembled.

Referring now to the drawings, there is shown in FIGS. 1 and 2, one preferred embodiment of the present invention, in which a clamping assembly M comprises a pair of basic boards 1 and 2 for retaining a plurality of members of the present invention therebetween, both being formed in slender, rectangular shapes while each having a through-bore 1a or 2a therein for permitting a clamping object (not shown) to be inserted therethrough, a clamping unit 7 including a pair of longitudinally clamping members 3 and 4 being coplanar with each other, and a pair of laterally clamping members 5 and 6 to be interleaved and interslid between the pair of longitudinally clamping members, five to ten of the clamping units 7 being usually interposed between the pair of basic boards 1 and 2 for practically assembling the device of the present invention as specifically shown in FIG. 2, and a driving unit 17 for forcibly effecting relative movement of the longitudinally clamping members and the laterally clamping members toward each other along a preselected line of movement.

As to the apparent shape as well as dimensions, the respective member constituting the pair of the basic boards 1 and 2, or the pair of the longitudinally clamping members 3 and 4, and the pair of the laterally clamping members 5 and 6 are not different from each other at all as shown in FIG. 1. The basic board 1 has three apertures 10 for set-screws in the side surface thereof, and an aperture 15 for receiving therein one end portion of the driving unit 17 in the side surface thereof, and the bore 1a mentioned above, and a groove 30 for permitting a shaft 9, which has been extended through apertures 31 of the movable stack of the longitudinally clamping members assembled, to slide therein. Similarly, the longitudinally clamping member 3 or 4 has a recessed portion with a pair of projected edge portions 4b and thereby, forming a dovetail groove 4a on the longitudinally end circumference thereof, to be engageable with a dovetail 18 of the driving unit 17, three corresponding apertures 10 for the set screws, and the aperture 31 for the shaft 9.

Moreover, the longitudinally clamping member 3 or 4 comprises a pair of guiding grooves or slots 3b and 3c, or 4b and 4c. One of the guiding grooves, relatively fixed, for example, 3c is arranged to relatively accommodate therein one of the pair of the laterally sliding member 5 following the sliding movement of the movable, longitudinally sliding member 4 relative to the longitudinally sliding member 3 maintained stationary, while the other guiding groove 3b is arranged to relatively hold the other of the pair of the laterally clamping member 6 in position thereof so that the laterally clamping member 6 is conversely accommodated in the groove 4c formed in the longitudinally clamping member 4 during the preselected sliding movement of the respective longitudinally clamping member 4 of the movable stack mentioned above.

The laterally clamping member 5 or 6 is formed in a shape outwardly curved, and is rounded at the top portion thereof 5a or 6a for coupling with the corresponding portion formed in the longitudinally clamping member 4b or 3b.

As to the specific shapes and dimensional characteristics of both the laterally clamping member as well as the longitudinally clamping member are further detailed hereinbelow from the point of the coupling and cooperating characteristics for clamping the object therebetween.

Being layered or stacked in succession, either the stack of one of the pair of the longitudinally clamping members 3 or 4, for example, the member 3 in the present embodiment, is to be fixedly interposed between the pair of the basic boards 1 and 2 by a plurality of set screws when the clamping assembly of the present invention is assembled in a unit so that the stack of one of the longitudinally clamping members have to remain stationary as the other stacked of the pair is, on the contrary, to be slid toward the stationary members mentioned above by means of the driving unit 17, although these situations are not particularly shown in these figures.

In contrast with the assembling mode of the clamping members 3 as described in the foregoing, the other longitudinally clamping members denoted by a numeral 4 in this embodiment are stacked in a manner such that these are piled in succession on the basic board 2 and successively, the guiding shaft 9 is extended through their apparently continuous apertures 31 resultantly formed in the stacked clamping members 4. However, each end of the guiding shaft 9 projected from either the upper or bottom surface of the piled clamping members 4 is further received by each groove 30 longitudinally formed in the basic board 1 and 2 respectively along the line of movement of the longitudinally clamping member 4 so that these projected portions together with their connected clamping members 4 by means of the guiding shaft 9 are altogether guided to slide along the both side grooves 30 through the projection-groove arrangement, when the external force is applied to the movable stack of the members 4 at the overall end thereof.

As described in the foregoing, the clamping assembly M of the present invention further includes the driving unit 17, which comprises a threaded rod 19 provided with a dovetail 18 at one end thereof, and at the other end thereof, an operable portion 20 having a through bore 20a radially extending therethrough for a manual lever (not shown) to be inserted, and a block member 17', which is provided with not only an upper and a bottom projection reduced in diameter 17a and 17b on each substantially upper and bottom surfaces thereof for resting therewith each of the pair of the basic members 1 and 2 through the projection-aperture arrangement and yet, being substantially high enough to be capable of interposing the several units of the clamping members between both shoulders of the projected portions 17a and 17b, but also a bore horizontally threaded for receiving therein the threaded rod 19 to permit it to advance or recede horizontally through screw motion with respect to the block member 17' maintained stationary as mentioned above.

By the arrangement described in the foregoing, after the dovetail 18 mentioned above having been engaged with the overall dovetail groove provided at the end circumference of the overall stack of the longitudinally clamping members piled in position, the rotational operation of the manual lever fitted to the operational portion 20 causes the linear, relative advancement of the movable stack of the longitudinally clamping members 4 with respect to the block member along the preselected longitudinal line of movement following the advancement of the threaded rod 19 now engaged with the longitudinally clamping members 4 in a manner as described in the foregoing.

Figure 3:
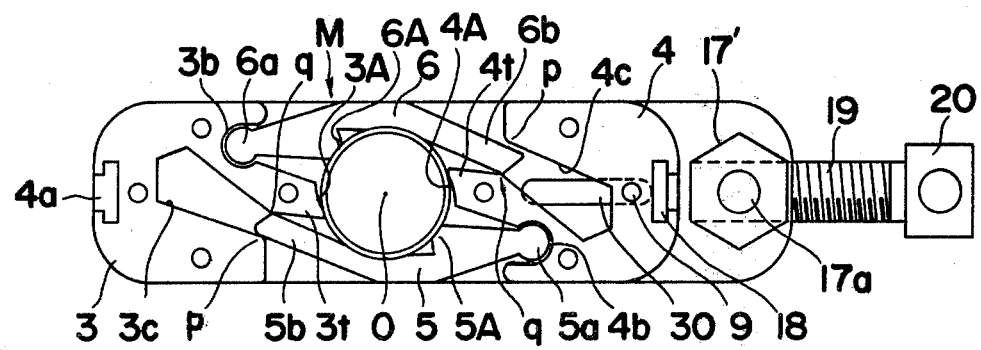
FIG. 3 is a top plain view of the embodiment shown in FIG. 2, with a pipe clamped therewith.

As shown in FIG. 3, the paired unit of the longitudinally clamping members 3 and 4 as well as the laterally clamping members 5 and 6 are coplanarly disposed each other on the basic board or on the other clamping unit 7 piled, each pair of members being symmetrical with each other to offset 180° about the centerline toward centerline.

More specifically, for setting the clamping unit 7, the pair of laterally clamping members 5 and 6 are internally stretched between the pair of the longitudinally clamping members 3 and 4 being in position on the basic board 2 so that the pair of the laterally clamping members are responsive to the variable positioning of the pair of the longitudinally clamping members for correspondingly adjustably positioning themselves, to maintain a clamping surfaces in predetermined array notwithstanding a variation in the cross section size thereof.

For assembling the both pairs of the members effectively for clamping the object through the intersliding and interleaving movement between the members described in the foregoing, the laterally clamping member 5 or 6, as a whole, formed in a shape curved outwardly to the forward end thereof and having a rounded portion 3b or 4b at one end thereof to be coupled by the corresponding rounding portion 6a or 5a formed in the longitudinally clamping member as described in the foregoing, whereby the laterally clamping member is arranged to be relatively guided inside the groove formed in the longitudinally clamping member when the movable stack of the longitudinally clamping members is slid along a preselected line of movement through the external force in a manner mentioned in the foregoing. For the purpose of the mutual, relative movements between the members, the rest, non-rounding portion of the laterally clamping member 5b or 6b is arranged to have nearly the same width along the longitudinal axis thereof and is formed in the shape outwardly curved as described in the foregoing, with the forward longitudinal end thereof being arranged to gradually incline along the line of movement or the longitudinal axis thereof. Therefore, within the pair of the guiding grooves 3c and 4c provided in the longitudinally clamping members as mentioned above, the laterally clamping members are guided, and thereby the inclined portion of the laterally clamping members 5b or 6b being received, when the external force is applied to the movable longitudinally clamping member.

More specifically, as shown in FIG. 3, the guiding groove 3c or 4c formed in the longitudinally clamping member has a guiding entrance for slidably accommodating the laterally clamping member. The forward end of the guiding groove 3c and 4c is arranged to extend beyond the longitudinal line of the movement of the movable set of the longitudinally clamping members so far as to the longitudinally rear part of the rounded portion 3b or 4b formed in the longitudinally clamping member, with gradually increasing the plain width thereof toward the forward end thereof, while the cornering edge portion p or q formed at the guiding entrance of the guiding groove successively accomplishes to effect respective point of action concerning the successive, sliding motion of the laterally clamping member 5 or 6 to be smoothly guided into the groove of the longitudinally clamping member 3 or 4 when the relative movement of the pair of the longitudinally clamping members toward each other along the line of movement is forcibly effected. The stripped portion 4t or 3t interposed between the pair of grooves 3b and 3c or 4b and 4c in the longitudinally clamping member is arranged to protrude to some extent from the longitudinally clamping member, with the forward end thereof being arranged to define a slanted shape 3A or 4A for constituting the securing portion of the longitudinally clamping member. Furthermore, the inner portion of the laterally clamping member 5 or 6 positioning near the rounded portion of the laterally clamping member is arranged to protrude from the other portion of the laterally clamping member, with the forward end thereof being arranged to define a slanted shape 5A or 6A for constituting the securing portion of the laterally clamping member.

The characteristic arrangement of the present invention concerning the clamping unit, in which both the pair of the longitudinally clamping members as well as the pair of the laterally clamping members are independently disposed on the basic board in a symmetrical manner with each other to offset 180° about the centerline toward centerline as described in the foregoing, causes not only the pair of the securing portions 3A and 4A, but also the pair of the securing portions 5A and 6A, to inwardly face with each other spaced in parallel relation when the object is clamped therebetween.

Figure 4:
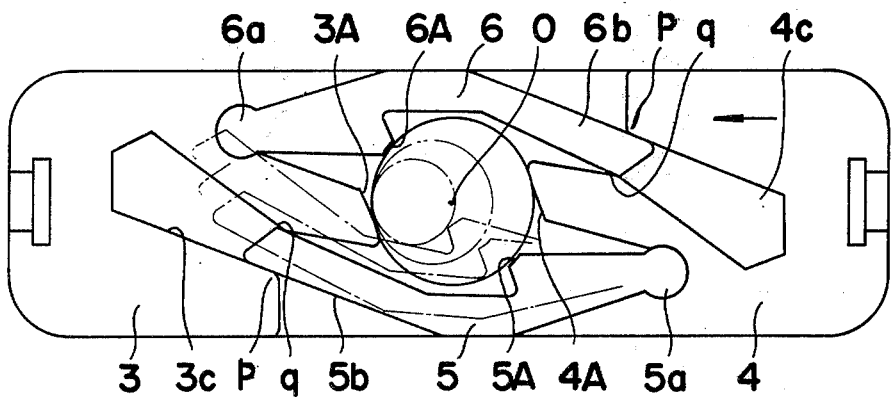
FIG. 4 is also a partial top plain view of the embodiment shown in FIG. 2, explanatory of clamping several pipes having different diameters with the same adjustable clamping device shown in FIG. 1.

The mutual disposition of the comprising members of the present invention in a receding state is shown and denoted by the real line in FIG. 4. From the receding situation described above, if the movable, longitudinally clamping member 3 are advanced toward the longitudinally clamping members 4 maintained stationary through the proceeding action caused by the advancing movement of the threaded rod 19 as the operational portion 20 is manually actuated by the external force, the pair of the laterally clamping members 5 and 6, either respective end 5a or 6a of which is being fitted in the corresponding portion 4b or 3b of the respective longitudinally clamping member 4 or 3 and relatively stationary maintained with respect to the movement of the movable, longitudinally clamping member, relatively and longitudinally come nearer with each other, depending upon the radial dimension of the object to be clamped as imaginally shown in FIG. 4, with their edged securing or clamping portions spaced in parallel relation, since respective rounded portion 5a or 6a mentioned above being relatively pushed longitudinally along the line of movement through either the action or the counteraction derived from the relative movement of the pair of the longitudinally clamping members 3 and 4, while the rest portion of the laterally clamping member, especially, the inclining portion 5b or 6b is interslid to be interleaved between the pair of the longitudinally clamping members.

More specifically, due to the longitudinally relative movement of the pair of the longitudinally clamping members and the resulant movement of the pair of the laterally clamping members, the respective outer circumference of the inclined portion of the laterally clamping member 5b or 6b is then directed to be guided into the respective groove described in the foregoing through the entrance edge portions of the groove, while the overall, laterally clamping member 5 or 6 is relatively pivoted with respect to the rounding portion 5a or 6a maintained relatively stationary in accordance with the movement of the inclined portion mentioned above, whereby the pair of the laterally clamping members relatively, laterally and automatically come nearer with each other for clamping the object therebetween.

For the purpose of the movement mentioned in the foregoing, the inwardly inclined angle of the inclined portion 5b or 6b with respect to the outermost flat circumference of the laterally clamping member parallel to the line of movement of the longitudinally clamping member is appropriately chosen in a manner such that the relative variation of the distance between the clamping portion 5A and the clamping portion 6A, accompanying with the relative variation of the distance between the inclined portion 5b and the inclined portion 6b, is to be well arranged by the dimensional characteristics concerning the inclined portion 5b and the inclined portion 6b with respect to the center of the object to be clamped, when these pairs are simultaneously slid with each other. Therefore, according to the arrangement of the present invention described in the foregoing, any pipes or the like having moderate diameters and extending through apparently continuous central bores formed in the clamping device assembled including the pair of the bores 1a and 2a are centripetally secured, with the four securing portions 3A and 4A, 5A and 6A of the clamping device simultaneously, peripherally pushing the pipe setted therebetween, when the clamping device is effected.

More specifically, the pipes or the like are centripetally secured by means of two pairs of the securing portions, wherein the relative portions of each pair of the securing portions 3A and 4A or 5A and 6A confronts each other when they are in securing positions, with respective contacting surface of each pair of the securing portions being spaced in the parallel relation from each other together with centripetally interposing the pipes or the like therebetween.

In connection with the situation described in the foregoing, respective securing force of the pair of relative securing forces coaxially exerted and caused by means of the pair of the securing portions 3A and 4A described above conversely directs on one line of action to the center of the pipe or the like being in position of the clamping device of the present invention assembled, while the other pair of the securing forces caused by means of the securing portions 5A and 6A conversely directs to the center of the pipe on the other line of action. Therefore, the pipe or the like setted in position of the clamping device of the present invention assembled is centripetally secured through two pairs of conversely directing forces, the two pairs of the securing portions defining therewith an adjustable size parallelogram array of clamping surfaces facing inwardly toward a clamping space.

Contrary to the securing situation described above, when the clamping device of the present invention is to be loosened because of the accomplishment of manufacturing process such as the pipe-cutting or pipe-bending, in which the object must be clamped in position by the device of the present invention, the successive actuation of the operational portion 20 of the driving unit 17 in the direction reverse to the clamping direction thereof permits the stack of the longitudinally clamping members to relatively recede with respect to both the object clamped and the stack of the longitudinally clamping members. In the loosening process described above, the clamping device according to the present invention is characterized in that the receding motion of the movable stack of the longitudinally clamping members 4 following the receding motion of the threaded rod 19, causes the inclined portion 6b to be extended outwardly with respect to the substantially longitudinal line of movement through the friction drive due to the entrance edge portion q of the respective, longitudinally clamping member together with the pivotal overall movement of the laterally clamping members 6 with respect to the rounded portion 6a relatively maintained in a stationary state. Similarly, as to the laterally clamping member 5, following the receding movement of the longitudinally clamping member due to the rounded portion 5a engaged thereof, the inclined portion 5b of the laterally clamping member 5 is relatively driven outwardly with respect to the line of movement by the entrance edge portion q of the longitudinally clamping members stationary maintained during the loosening operation. Furthermore, simultaneous and mutual, receding displacements of the four securing portions caused by the loosening actuation of the operational portion 20 through the receding movement of the threaded rod 19 is appropriately arranged to be equivalent.

There is shown in FIGS. 5 to 9, the modified embodiment of the present invention, wherein the corresponding groove formed in the longitudinal clamping member for accommodating therein the laterally clamping member is arranged to permit the laterally clamping member to slightly pivot with respect to the entrance portion thereof or the longitudinal line of movement of the movable stack, and the other specific characteristics will be further detailed hereinbelow.

Figure 5:
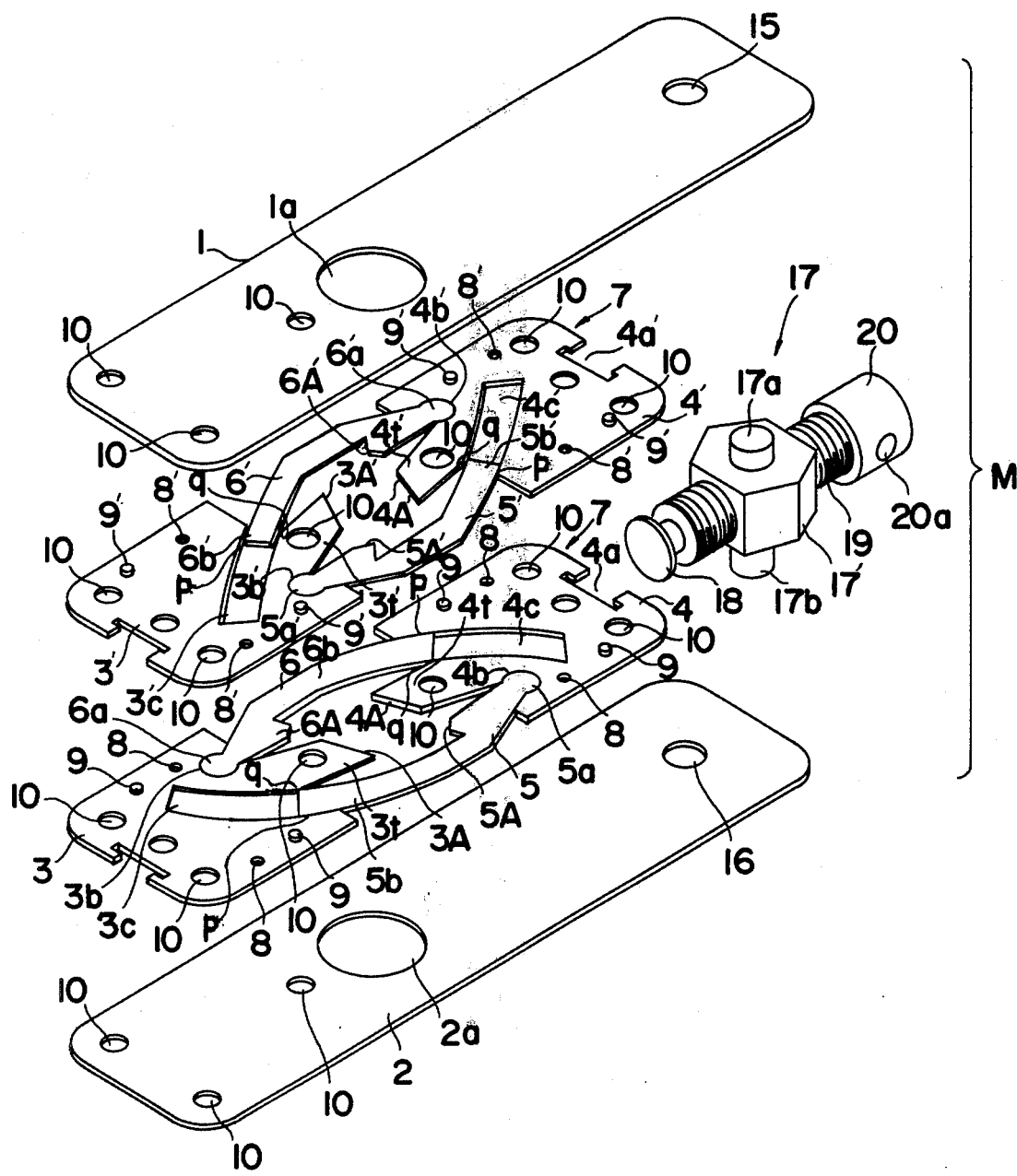
FIG. 5 is an exploded view of a modified embodiment of the adjustable clamping device of the present invention, with the comprising members being disassembled.
Figure 6:
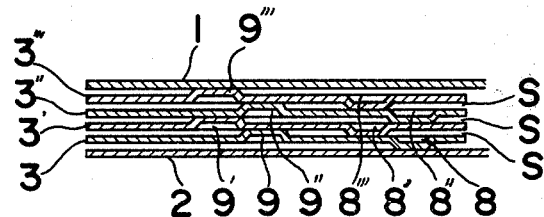
FIG. 6 is a partial side view in section taken along the longitudinal centerline of the embodiment shown in FIG. 5, after the comprising members having been assembled.
Figure 7A:
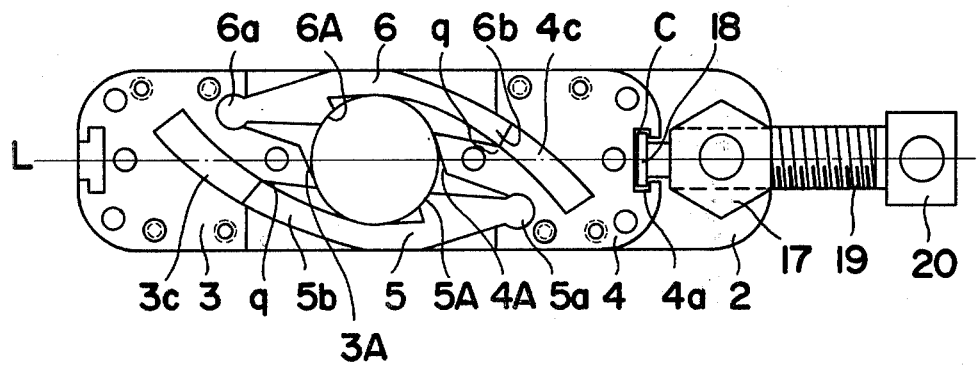
FIGS. 7a and 7b are partial top plain views of a modified embodiment of the adjustable clamping device of the present invention, with a pipe being clamped respectively.
Figure 7B:
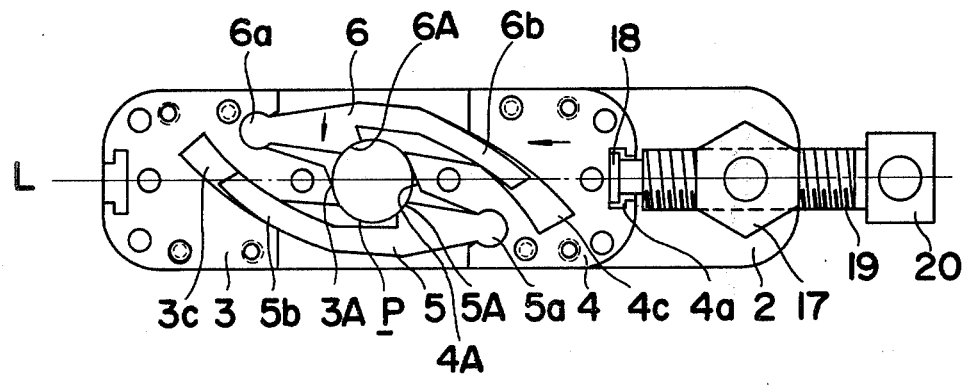

As shown in FIG. 5, in this modified embodiment, the pair of the longitudinally clamping members 3 and 4 or 3' and 4' are coplanarly disposed with each other on the basic board 2 or the other clamping unit in a symmetrical manner with each other to offset 180° about the centerline toward centerline, respectively copossessing the same center axis. Moreover, in connection of the stacking method of the longitudinally clamping members, the longitudinally clamping members 3 and 3' as well as 4 and 4' are reverse in the positioning thereof with each other together with the paired laterally clampoing members when constructing the respective stack of the longitudinally clamping members and thereby, the resultant clamping unit constituted by the two adjacent layers, for example, 3 and 3', and 4 and 4' as specifically shown in FIG. 5, whereby the resultant four pairs i.e., 3A and 4A, 5A and 6A, 3A' and 4A', and 5A' and 6A' of the securing portions provided with the two layers define therewith an adjustable size octangular array of clamping surfaces facing inwardly toward a clamping space, while the clamping array mentioned in the foregoing is a parallelogram array as shown in FIGS. 3 and 4. However, it is, of course, possible to provide the parallelogram array by using the members described above in connection with the FIG. 5 as shown in FIG. 7a and 7b. Furthermore, as shown in FIG. 5, there is provided with respective pair of the projected portion 9 or 9' and recessed portion 8 or 8' pressed through the pressing process of the longitudinally clamping member 3 or 4 on the both sides of the longitudinal centerline of the longitudinal clamping member 3 and 4, while the proceeding distances and their turns of the pair of the projected portion and the recessed portion on respective side with respect to the head portion 3t or 4t of the member are arranged to become different therebetween in a manner such that, when these longitudinally clamping member paired are piled or layered in succession, the combinations of the upwardly projected portions 9 and 9' and 9" and 9"' on the respective longitudinally clamping member and the downwardly projected portions, 8 and 8', 8" and 8"' on the respective longitudinally clamping member renders respective clearance s between their respective interface of the paired adjacent layers as specifically shown in FIG. 6, whereby even if variation in substantial width in a plurality of the laterally or longitudinally clamping members exists, the respective clearance described above permits the respective securing inter-connection between the pair of the longitudinally clamping members and the pair of the laterally clamping members intersliding and interleaving nearly coplanarly with each other within the respective clearance described above or the height of the projected portion on the longitudinally clamping members.

Furthermore, due to the respective clearance s rendered between the paired adjacent layers by the arrangement described above, even if the external driving force is local for the movement of the movable stack of the longitudinally clamping members 4, the movable stack, as a whole, can be easily driven to slide toward the other stack of the longitudinally clamping members 3 remained stationary and thereby, further effecting the smoothly internal sliding relative motion among the members of the respective clamping unit, which may otherwise requires quite large external force as well as precise surface treatment of the members mentioned above.

As described in the foregoing, either side of the stacked clamping members are fixedly interposed between the pair of the basic boards 1 and 2, through several bolts of through type, although not particularly shown in the drawings. Furthermore, as is clear from this modified embodiment of the present invention as specifically shown in FIG. 5, the provisions concerning the sliding shaft and the corresponding guiding groove in the basic board as specifically shown in FIG. 1 is not specially necessary for the clamping device of the present invention. Moreover, as for the engagement between the dovetail groove 4a formed in the longitudinally clamping members stacked and the dovetail 18 provided at the forward end of the threaded rod 19, the dimensional characteristics of the dovetail groove mentioned above relative to the dimensions of the dovetail is arranged to provide respective longitudinal or radial clearances c with respect to the line of movement when engaged by the dovetail 18 of the threaded rod 19 as specifically shown in FIG. 8, whereby the apparently continuous groove 4a formed in the stack of the longitudinally clamping members 4 layered and the dovetail 18 are loosely engaged therebetween due to the clearances c mentioned above, and thereby, the dovetail 18 as well as the movable stack of the longitudinally clamping members, as a whole, which are not guided or rigidly guided by the guiding shaft and the groove connection in this embodiment, can relatively oscillate with respect to the preselected longitudinal line of movement of the clamping device itself as specifically shown in FIG. 8, when the threaded rod is forwardly moved to cause the movable stack of the longitudinally clamping members to relatively advance toward the stack of the longitudinally clamping members maintained stationary on the basic board 2.

Figure 8:
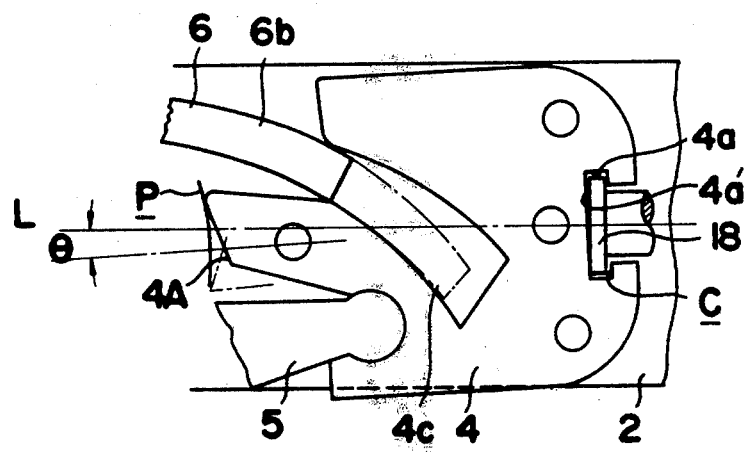
FIG. 8 is a partial top plain view of the modified embodiment shown in FIG. 6 explanatory of oscillating movement of a movable set of the longitudinally clamping members.

The permissive oscillating movement concerning the movable stack of the longitudinally clamping members themselves, as a whole, described above, accompanied by the effect caused by the loose engagement between the groove formed in the respective longitudinally clamping member and the inclined portion of the respective laterally clamping member due to the substantial wide difference therebetween described in the foregoing, permits the respective securing portion thereof to gradually face the outer circumference P of the pipe or the object to be secured therewith while the respective pair of four pairs being spaced in parallel relation with each other, when the respective laterally clamping member is further, gradually automatically guided into the respective groove and forced to face the outer circumference P of the pipe or the object in a way as specifically shown in a two dotted line in FIG. 8.

The resultant oscillating movement or displacement of the member of the movable stack of the longitudinally clamping member 4 with respect to the preselected longitudinal line L of movement of the movable stack of the present invention is denoted by $\theta$ in FIG. 8, the center of the oscillating movement or displacement of the longitudinally clamping member 4 being originated from the forward contacting surface of the threaded rod 19.

Figure 9:
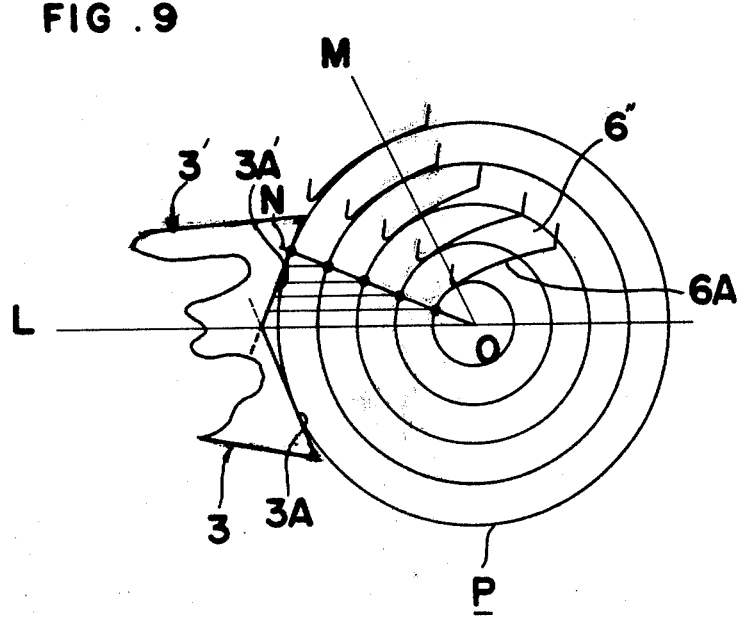
FIG. 9 is a fragmentary view showing, on an enlarged scale, specific situation for clamping the pipes having different diameters, with the securing, resultant angle constituted between the two adjacent securing portions being maintained at 45 degrees with the modified embodiment shown in FIG. 6.

Although the securing angle constituted between the adjacent securing portions is not especially defined in the foregoing and can be arranged to be the right angle whose apex is naturally the axis of the object to be clamped, the angle constituted between two portions mentioned above in the modified embodiment is arranged to be 45 degrees. Specific situation for clamping the pipe or the object of different diameters, with the securing, resultant angle constituted between the two adjacent securing portions of the paired layers being maintained in the 45 degrees in the modified embodiment, is shown in FIG. 9. Although the points of contact of the securing portion 6A as well as the point of contact of the securing portion 3A' vary as shown in FIG. 9, depending upon the diameter of the object P to be secured, the angle constituted between the locus of the respective point of contact concerning the securing portion 3A' with respect to the center axis O of the object as denoted by a line N and the corresponding locus of the respective point of contact concerning the securing portion 6A with respect to the center axis O of the object as denoted by a line M may be always 45° resultant four pairs of members defining therewith an adjustable size octangular array of clamping surfaces facing inwardly toward a clamping space.

The permissive oscillating movement concerning the movable stack of the longitudinally clamping members, as a whole, described above, accompanied by the effects caused not only by the loose engagement between the groove or the slot formed in the longitudinally clamping member and the inclined portion due to the substantial wide difference therebetween described in the foregoing, but also by the reduced contacting surface of the paired adjacent layers, permits the respective securing portion to gradually face the outer circumference of the pipe or the object to be secured therewith, while the respective pairs of four pairs are spaced in parallel relation with each other, when the respective laterally clamping member is further, gradually guided into the groove and forced to face the outer circumference of the pipe or the object to be clamped for accomplishing peripheral clamping engagement.

By the arrangement of the present invention as described in the foregoing, clamping of a pipe or the like is readily and conveniently achieved.

Furthermore, since the respective member of the pair of the laterally clamping members as well as the longitudinally clamping members except for the longitudinally clamping members with the projection and recess, are all identical with each other concerning shapes and dimensional characteristics thereof, the manufacturing cost of the metal mold for manufacturing the members is also resultantly reduced.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. An adjustable clamping device for clamping a pipe or the like through peripheral clamping engagement, which comprises a first fixed slide member having first slot and a second slot, said first slide member having a first clamping portion between said first slot and said second slot, a second slide member having a third slot and a fourth slot, said second slide member having a second clamping portion between said third and said fourth slot, a pair of said third and said fourth slots being coplanar with a pair of said first and said second slots, a third slide member having a slide portion at one longitudinal end thereof slidably received in said second slot and a portion at the other longitudinal end thereof fitted in said fourth slot, said third slide member having a third clamping portion between said one end and said other end thereof, a fourth slide member having a slide portion at one longitudinal end thereof slidably received in said third slot and a portion at the other longitudinal end thereof fitted in said first slot, said fourth slide member having a fourth clamping portion between said one end and said other end thereof, means for mounting said first to fourth members for variable spacing therebetween along a preselected line of movement, and means for forcibly effecting relative movement of said first and second members toward each other along said line of movement.

2. An adjustable clamping device as claimed in claim 1, and further including a dovetail groove at a peripheral circumference of said second slide member, and a dovetail portion belonging to said means for forcibly effecting relative movement, wherein an engagement between said dovetail groove formed by a movable stack of said second members and said dovetail portion is relatively loose to permit said stack of said second slide members to slightly oscillate with respect to said longitudinal line of movement as said relative movement of said first and second members toward each other is forcibly effected along said line of movement.

3. An adjustable clamping device as claimed in claim 2, wherein said first slide member and said second slide member are identical with each other, with a forward portion of said slot for receiving said slide portion of said slide member gradually increasing a plain width thereof, said third slide member and said fourth slide member being identical with each other.

4. An adjustable clamping device as claimed in claim 3, wherein said first slide member and said second slide member are layered in succession, said first and said second members paired together with said third and fourth slide members paired, respectively, offsetting 180 degrees about said centerline toward said centerline, copossessing a same center axis on said centerline.

5. An adjustable clamping device as claimed in claim 4, wherein said clamping portion of said member having said slots is formed in a slanted shape with respect to said line of movement, said clamping portion of said member having said sliding portion being formed in a slanted shape with respect to an outer circumference of said member, which is parallel to said line of movement when said member is disposed in a clamping position, successive members of said member having slots for making said stack being reverse in the positioning thereof, with said member having said slide portion being correspondingly disposed, whereby resultant four pairs of said clamping portions provided with said two layers adjacently paired define therewith an adjustable size octangular array of clamping surfaces facing inwardly toward a clamping space.

6. An adjustable clamping device for clamping a pipe or the like through peripheral clamping engagement, which comprises a first fixed slide member having a first slot and a second slot, said first slide member having a first clamping portion between said first slot and said second slot, a second slide member having a third slot and a fourth slot, said second slide member having a second clamping portion between said third and said fourth slot, a pair of said third and said fourth slots being coplanar with a pair of said first and said second slots, a third slide member having a slide portion at one longitudinal end thereof slidably received in said second slot and a portion at the other longitudinal end thereof fitted in said fourth slot, said third slide member having a third clamping portion between said one end and said other end thereof, a fourth slide member having a slide portion at one longitudinal end thereof slidably received in said third slot and a portion at the other longitudinal end thereof fitted in said first slot, said fourth slide member having a fourth clamping portion between said one end and said other end thereof, means for mounting said first to fourth members for variable spacing therebetween along a preselected line of movement, and means for forcibly effecting relative movement of said first and second members toward each other along said line of movement including a dovetail groove at a peripheral circumference of said second slide member, and a dovetail portion belonging to said means for forcibly effecting relative movement, an engagement between said dovetail groove formed by a movable stack of said second members and said dovetail portion being relatively loose to permit said stack of said second slide members to slightly oscillate with respect to said longitudinal line of movement as said relative movement of said first and second members toward each other is forcibly effected along said line of movement, said first slide member and second member being identical with each other, with a forward portion of said slot for receiving said slide portion of said slide member gradually increasing a plain width thereof and yet, respectively being provided with at least one combination of at least one projection and at least one recess lined in a longitudinal direction thereof on a respective side of a longitudinal centerline thereof, with respective distance and their turns of said projection and recess concerning said combination with respect to a head edge of said member being different among combinations, said third slide member and said fourth slide member being identical with each other.

7. An adjustable clamping device as claimed in claim 6, wherein said first slide member and said second slide member are layered in succession, said first and said second members paired together with said third and fourth slide members paired offsetting 180 degrees about said centerline toward said centerline, copossessing a same center axis on said centerline.

8. An adjustable clamping device as claimed in claim 7, wherein said clamping portion of said member having said slots is formed in a slanted shape with respect to said line of movement, said clamping portion of said member having sliding portion being formed in a slanted shape with respect to an outer circumference of said member, which is parallel to said line of movement when said member disposed in a clamping portion, successive members of said member having slots for making said stack being reverse in the positioning thereof, with said member having said slide portion being correspondingly disposed, whereby resultant four pairs of said clamping portions provided with said two layers adjacently paired define therewith an adjustable size octangular array of clamping surfaces facing inwardly toward a clamping space.

* * * * *